United States Patent [19]

Frank

[11] 4,006,524
[45] Feb. 8, 1977

[54] METHOD OF MAKING A HOSE COUPLING
[75] Inventor: Irving G. Frank, Euclid, Ohio
[73] Assignee: The Weatherhead Company, Cleveland, Ohio
[22] Filed: Aug. 4, 1975
[21] Appl. No.: 601,543

Related U.S. Application Data

[62] Division of Ser. No. 478,582, June 12, 1974, Pat. No. 3,924,883.
[52] U.S. Cl. .................. 29/455 R; 29/508; 29/523
[51] Int. Cl.² ............... B21D 39/00; B23P 19/04
[58] Field of Search............29/523,508,455; 285/256, 285/382.4, 382.5

[56] References Cited
UNITED STATES PATENTS

| | | | |
|---|---|---|---|
| 1,440,493 | 1/1923 | Reed | 29/523 UX |
| 1,474,473 | 11/1923 | Herold | 29/523 UX |
| 2,516,689 | 7/1950 | France et al. | 29/523 X |
| 2,864,159 | 12/1958 | Doering | 29/523 X |
| 3,220,753 | 11/1965 | Kasidas | 285/256 X |
| 3,497,946 | 3/1970 | Tengley | 29/523 X |
| 3,549,180 | 12/1970 | MacWilliam | 285/256 |
| 3,787,945 | 1/1974 | Pasek et al. | 29/523 X |
| 3,930,298 | 1/1976 | Ridenour | 29/523 |

*Primary Examiner*—Charlie T. Moon
*Attorney, Agent, or Firm*—McNenny, Pearne, Gordon, Gail, Dickinson & Schiller

[57] ABSTRACT

A method and apparatus are disclosed for coupling a flexible hose to a metal tube. A metal reinforcing sleeve is placed over the outside of the tube, and a metal collar is placed over the outside of the reinforcing sleeve. The tube and reinforcing sleeve and collar are secured together by simultaneously bumping the tube and reinforcing sleeve to form, in a single operation, radially outwardly projecting beads on the tube and reinforcing sleeve on each side of the collar.

3 Claims, 3 Drawing Figures

U.S. Patent     Feb. 8, 1977     4,006,524
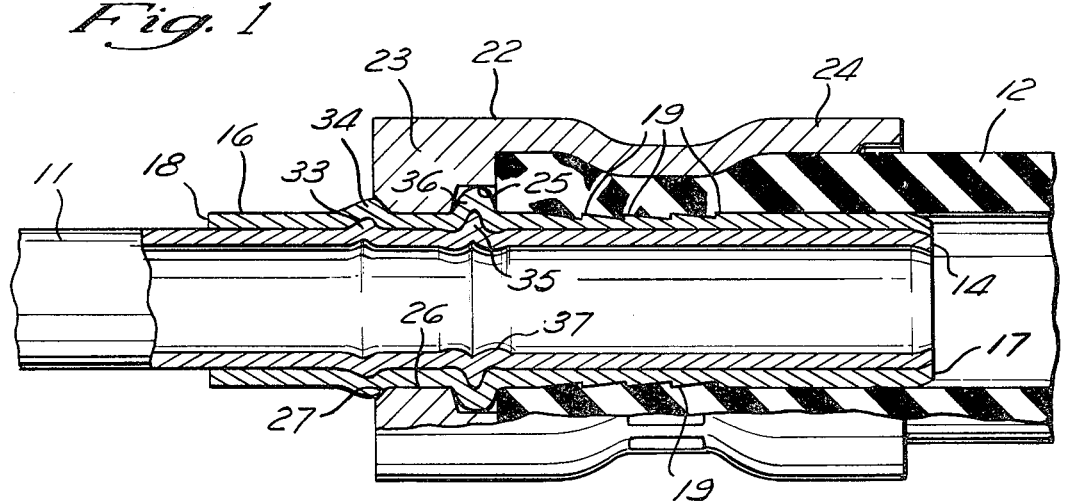
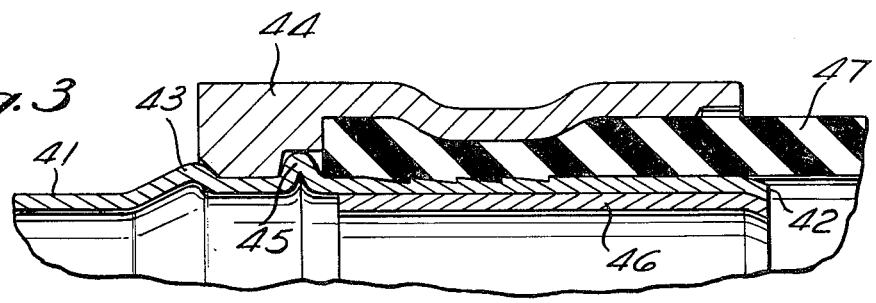
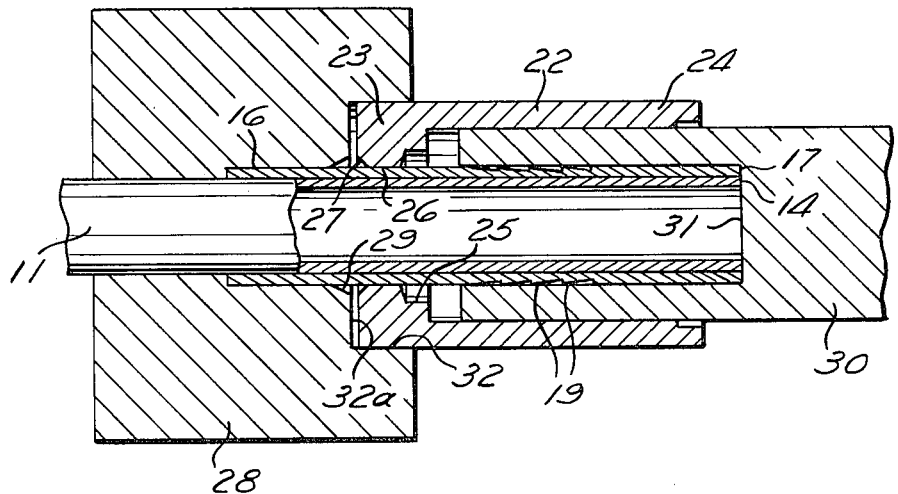

METHOD OF MAKING A HOSE COUPLING

This is a division of application Ser. No. 478,582 filed June 12, 1974, now U.S. Pat. No. 3,924,883.

BACKGROUND OF THE INVENTION

Hose couplings are used in a wide variety of applications for connecting a flexible hose to a metal tube. One such application is in automobile power steering circuits, wherein the flexible hose is coupled to one end of a metal tube, and the other end of the metal tube is connected to the power steering pump or to the power steering valve. In such applications for hose couplings, it is necessary that the coupling withstand adverse conditions of temperature variations, pressures pulsations, and engine vibrations.

A widely used prior art hose coupling and method are illustrated in FIG. 3 of the drawings. The flexible hose is inserted into an annular cavity between a collar and the metal tube, and the collar is then crimped radially inwardly to squeeze the hose between the collar and the metal tube. A reinforcing sleeve is placed inside the metal tube so that the crimping of the collar does not collapse the metal tube.

Although this prior art coupling and method illustrated in FIG. 3 have enjoyed wide commercial acceptance, they provide a relatively complex solution to the problem of coupling a hose to a metal tube. In order that the tube coupling not restrict the flow of fluid, the metal tube is expanded at its free end so that a reinforcing sleeve having an inner diameter approximately equal to the normal inner diameter of the metal tube can be inserted into the metal tube. After expansion of the metal tube, a rear bead is formed on the tube by axial bumping of the free end of the tube. A collar is then placed on the expanded free end of the tube, and a front bead is formed on the tube to secure the collar in place.

Other prior art couplings are shown in U.S. Pat. Nos. 3,345,091 and 3,787,945.

SUMMARY OF THE INVENTION

The present invention departs from these prior art couplings by providing a hose coupling and method in which the reinforcing sleeve is disposed on the outside of the metal tube and in which axially spaced beads are formed in a continuous bumping operation to hold the collar in place.

The metal reinforcing sleeve is placed on the outside of the tube, and the collar is placed on the outside of the reinforcing sleeve. An axial force is applied simultaneously to the free ends of the tube and reinforcing sleeve to bump or form radially outwardly projecting beads on the tube and reinforcing sleeve to secure the tube and reinforcing sleeve and collar together. The simultaneous bumping of the tube and reinforcing sleeve produces an interior annular notch on the reinforcing sleeve bead, and the confronting tube bead is received within the notch to radially and axially squeeze the tube and reinforcing sleeve beads together to prevent fluid leakage therebetween.

The radially outwardly projectig beads are formed on both the rear and the front sides of the collar in a continuous uninterrupted operation. This avoids the necessity of forming the rear and front beads in separate operations as required in the prior art. In order to accomplish this, the collar moves axially during formation of the rear beads and is held stationary during formation of the front beads.

BRIEF DESCRIPTION OF THE DRAWINGS

These and other aspects and advantages of the invention will become more readily apparent upon an understanding of the accompanying drawings, wherein:

FIG. 1 is a side elevational view, partly in cross-section, of a hose coupling method and apparatus according to the principles of the invention;

FIG. 2 is a schematic showing of one step of the method according to the principles of the invention; and FIG. 3 is a side elevational view, partly in cross-section; of a prior art hose coupling.

DETAILED DESCRIPTION OF THE DRAWINGS

Referring now to the drawings in greater detail, FIG. 1 shows a steel tube 11 of predetermined axial extent which is coupled to a flexible hose 12 in accordance with the principles of the invention. The steel tube 11 in the disclosed embodiment has a cylindrical interior surface, a cylindrical exterior surface of about 5/16 inch diameter, and a forward free end 14. The hose 12 in the disclosed embodiment is of about ⅝ inch interior diameter and about ¾ exterior diameter. The hose 12 may be of any suitable material and is preferably provided with a plurality of layers of elastomeric hose material and reinforcing braid in a well-known manner.

A tubular steel reinforcing sleeve 16 is disposed on the exterior of the tube 11. The reinforcing sleeve 16 includes interior and exterior cylindrical surfaces which terminate at a forward free end 17 and a rearward end 18. The exterior surface of the reinforcing sleeve 16 is provided with a plurality of annular radially outwardly projecting barbs 19 which grip the interior of the hose 12 to prevent axial pull out of the hose. The barbs 19 are formed on the exterior surface of the reinforcing sleeve 16 prior to assembly of the reinforcing sleeve 16 on the exterior of the tube 11.

A cylindrical steel collar or ferrule 22 is disposed on the exterior of the reinforcing sleeve 16. The collar 22 includes a small interior diameter body portion 23, a larger interior diameter skirt portion 24 extending axially from the body portion 23 toward the forward free ends 14 and 17, and a counterbore 25 at the juncture of the portions 23 and 24. The collar body portion 23 includes a bore 26 extending therethrough and an annular relief 27 at the leftmost end of the bore 26. The collar body portion 23 is disposed intermediate the ends 17 and 18 of the reinforcing sleeve 16, and the reinforcing sleeve 16 extends axially rearwardly from the collar body portion 23 a sufficient distance to prevent unwanted bending or breaking of the tube 11 adjacent the collar 22.

The manner of securing the tube 11 and reinforcing sleeve 16 and collar 22 together is shown in FIGS. 1 and 2. The reinforcing sleeve 16 and tube 11 are placed in a stationary clamping die 28, with a slip fit provided between the sleeve 16 and tube 11. The stationary die 28 is generally cylindrical and is cut into two semicircular halves which tightly clamp one end of the tube 11 and reinforcing sleeve 16 against any axial or radial movement. The stationary die 28 includes an annular rearward bead cavity 29 for forming the rearward bead on the tube 11 and reinforcing sleeve 16 as described below. The stationary die 28 also includes a suitable enlarged diameter portion 32 for slidably receiving the collar 22. The collar 22 is disposed on the exterior of the reinforcing sleeve 16 with a slip fit between the sleeve 16 and collar 22, and the collar 22 is positioned a predetermined axial distance (about ⅛ inch in the preferred embodiment) from the end wall 32a of the enlarged diameter portion 32.

After the tube 11 and reinforcing sleeve 16 and collar 22 are positioned in the stationary die 28 in this manner, a cylindrical movable die 30 is advanced toward the stationary die 28. A flat abutment surface 31 of the movable die 30 engages the end faces 14 and 17 during such movement of the movable die 30 relative to the stationary die 28 and applies a continuous uninterrupted axial force to the end faces 14 and 17. Continued movement of the movable die 30 after such engagement in a direction to the left as viewed in FIG. 2 begins to radially outwardly deflect the reinforcing sleeve 16 and the tube 11 at the locations where such radially outward deflection is not constrained by the stationary die 28 or the movable die 30. This causes the exterior cylindrical surface of the reinforcing sleeve 16 to push radially outwardly against the collar bore 26 so that the collar 22 begins to move to the left as viewed in FIG. 2 with its confronting exterior surface of the reinforcing sleeve 16. Continued movement of the movable die 30 simultaneously radially outwardly deflects the reinforcing sleeve 16 and the tube 11 into the rear bead cavity 29. When this deflection into the rear bead cavity 29 is completed, the leftmost end face of the collar 22 engages the end wall 32a of the stationary clamping die 28 to prevent further axial movement of the collar 22.

Continued movement of the movable die 30 in a direction toward the left after the collar 22 engages the end face 32a simultaneously radially outwardly deflects the reinforcing sleeve 16 and tube 11 into the counterbore 25 of the collar 22. When this deflection into the counterbore 25 is completed, the movable die 30 is stopped against further movement to the left by engagement of the leftmost end face of the movable die 30 with the confronting surface of the collar 22, and the movable die 30 the axial retracted to the right. Although the movement of the die 30 to the left as viewed in FIG. 2 is described above in segments for purposes of clarity, the movement of the die 30 is continuous and uninterrupted so that the die 30 does not stop until it engages the collar 22 and retracts. Additionally, although the rear beads are described above as being fully formed before the front beads are formed, the rear and front beads could alternately be formed at the same time or the front beads could be formed first depending upon the time at which axial movement of the collar 22 takes place. This time of movement of the collar 22, whether before or after or during formation of the front beads 35 and 36, may be controlled by suitable hydraulic means not shown in the drawings. The free ends 14 and 17 are then coined over to provide easier assembly of the hose 12 as described below. The two halves of the stationary die 28 are then separated, and the tube 11 and reinforcing sleeve 16 and collar 22 are removed.

In this manner, annular radially outwardly projecting rear beads 33 and 34 are simultaneously formed on the tube 11 and reinforcing sleeve 16, and annular radially outwardly projecting front beads 35 and 36 are simultaneously formed on the tube 11 and reinforcing sleeve 16 at a location axially spaced from the rear beads. The interior of the reinforcing sleeve bead 36 provides an annular notch into which the exterior of the tube bead 35 projects, and the interior of the bead 36 and exterior of the bead 35 each provide surfaces which face in the radial and axial directions. The simultaneous forming of the front beads 35 and 36 causes the radially and axially facing confronting surfaces of the front beads 35 and 36 to be squeezed together radially and axially. This provides a metal to metal seal at the location of the forward beads to prevent fluid leakage between the tube 11 and reinforcing sleeve 16. In a similar manner, the simultaneously formed rearward beads 33 and 34 are also squeezed together in both the radial and axial directions for sealing purposes.

In the presently preferred embodiment, the end faces 14 and 17 are flush or co-planar when they are initially engaged by the movable die abutment surface 31 (FIG. 2) and are flush after formation of the front and rear beads (FIG. 1), so that the tube 11 and reinforcing sleeve 16 are deflected axially the same distance during formation of the beads. However, the tube 11 is deflected radially outwardly a smaller amount than the reinforcing sleeve 16 during this axial deflection as shown in FIG. 1. Because of this, the interior surface of the tube 11 may be deflected radially inwardly a small amount as indicated by reference numeral 37 in FIG. 1. If desired, it is believed that this radially inward deflection can be reduced by arranging the end face 14 slightly to the left of the end face 17 as viewed in FIG. 2 so that the tube 11 is deflected axially less than the reinforcing sleeve 16.

The axial distance through which the collar 22 moves to the left as viewed in FIG. 2 until it engages the end face 32a is related to the formation of the rearward beads 33 and 34 and the forward beads 35 and 36. If this axial distance is too small, the rearward beads 33 and 34 will not be fully formed. This is because the collar 22 will engage the end face 32a before the rearward beads are fully formed, and further formation of the rearward beads will be prevented because the forward beads will begin to be formed. Similarly, if this axial distance is too great, the forward beads 35 and 36 will not be fully formed. This is because a greater amount of material of the reinforcing sleeve 16 and tube 11 will be used in the rear beads, and the leftmost end face of the movable die 30 will engage its confronting surface of the collar 22 before the forward beads have been fully formed. In this manner, the axial location of the collar 22 between the leftmost end face of the movable die 30 and the end face 32a of the stationary die 28 controls the formation of the rearward beads and of the forward beads.

After the tube 11 and reinforcing sleeve 16 and collar 22 are secured together in this manner, the hose 12 is inserted axially into the annular cavity formed between the exterior of the reinforcing sleeve 16 and the interior of the skirt portion 24. The skirt portion 24 is then crimped radially inwardly by any well-known crimping machine in the manner shown in FIG. 1 to positively secure the hose 12 in place.

The above described features and advantages of the present invention may be contrasted with a prior art hose coupling shown in FIG. 3. A metal tube 41 is first expanded at its right end radially outwardly by inserting a suitable mandrel into the right end of the tube 41. The metal tube 41 is then bumped by applying an axial force to its free end 42 to form a rear annular bead 43. A collar 44 is placed over the end of the tube 41, and a front bead 45 is formed by applying a force to the free end 42. A reinforcing sleeve 46 is placed inside the tube 41 to prevent radially inward collapse of the tube 41 upon crimping of the collar 44. The ends of the tube 41 and reinforcing sleeve 46 are then coined over to prevent the reinforcing sleeve 46 from sliding out of the tube 41 and to provide easier assembly of a hose 47 into the coupling. The collar 44 is then crimped radially inwardly to secure the hose 47 in place.

Having described a preferred embodiment of the present invention, it is to be understood that various modifications and rearrangements may be made without departing from the subject matter of the following claims.

I claim:

1. A method of making a hose coupling comprising the steps of selecting a length of metal tube having a free end and an interior and an exterior, selecting a metal reinforcing sleeve of predetermined axial extent and having a free end and an interior and an exterior, placing the reinforcing sleeve over the exterior of the metal tube, selecting a metal collar of predetermined axial extent and having a small interior diameter body portion and a larger interior diameter skirt portion, placing the collar over the exterior of the reinforcing sleeve, applying an axial force to the end faces of the tube and reinforcing sleeve, and simultaneously radially outwardly deflecting the tube and reinforcing sleeve at axially spaced locations on each side of the collar body portion to form annular beads on both sides of the collar body portion with the beads of the tube extending into the beads of the reinforcing sleeve.

2. The method as set forth in claim 1 including squeezing together the exterior of the bead of the tube and the interior of the bead of the reinforcing sleeve both radially and axially.

3. A method as set forth in claim 1 including clamping the tube and reinforcing sleeve against axial movement relative to one another during forming of the beads on both sides of the collar body portion, and moving the collar relative to the clamped portion of the tube and reinforcing sleeve during forming of the beads on the one side of the collar body portion.

* * * * *